XR 3,550,084

TX 3045Y
X 3054W

Dec. 22, 1970 J. E. BIGELOW ET AL 3,550,084

SYSTEM AND METHOD FOR IDENTIFYING A SET OF GRAPHIC CHARACTERS GROUPED TOGETHER ON A VISIBLE INFORMATION DISPLAY

Filed June 27, 1966 6 Sheets-Sheet 1

Inventors:
John E. Bigelow,
Charles Q. Lemmond,
by
Their Attorney.

3550084
OR IN 340/146.3B

Inventors:
John E. Bigelow,
Charles Q. Lemmond,
by Marvin Snyder
Their Attorney.

Inventors:
John E. Bigelow,
Charles Q. Lemmond,
by Marvin Snyder
Their Attorney.

Inventors:
John E. Bigelow,
Charles Q. Lemmond,
by Marvin Snyder
Their Attorney.

Inventors:
John E. Bigelow,
Charles Q. Lemmond,
by Marvin Snyder
Their Attorney.

SYSTEM AND METHOD FOR IDENTIFYING A SET OF GRAPHIC CHARACTERS GROUPED TOGETHER ON A VISIBLE INFORMATION DISPLAY

Filed June 27, 1966

Inventors:
John E. Bigelow,
Charles Q. Lemmond,
by Marvin Snyder
Their Attorney.

3,550,084

SYSTEM AND METHOD FOR IDENTIFYING A SET OF GRAPHIC CHARACTERS GROUPED TOGETHER ON A VISIBLE INFORMATION DISPLAY

John E. Bigelow and Charles Q. Lemmond, Schenectady, N.Y., assignors to General Electric Company, a corporation of New York Filed June 27, 1966, Ser. No. 560,419
Int. Cl. G06k *9/08;* G02b *5/18*
U.S. Cl. 340—146.3 21 Claims

ABSTRACT OF THE DISCLOSURE

A system is disclosed for identifying graphic displays, such as license plates, including alpha-numeric combinations having a predetermined positional relationship with a common display, such as the name New York, in accordance with which an holographic recognition system is employed to recognize from information stored on a complex spatial filter the number and letter combination of a license plate recorded by electrophotographic means on a deformation medium essentially instantaneously with the optical exposure to an image of the display. The recognition is indicated by light spots on an image plane of the recognition system having positions relative to the position of the recognition spot for the fixed indicia, such as New York, dependent upon the graphic character information in the complex spatial filter and the position of the character in the license plate letter-number combination. The positional information is imaged on a camera tube and electrically converted to computer input information for utilization in comparing with stored license plate letter-number combinations in the computer. In a second modification, the spatial filters of each of the alpha-numeric characters occupy a separate area in a circular array on a rotatable disk. The angular position of the disk when recognition of a character is effected is indicative of the particular character recognized.

This invention relates to character recognition systems, and more particularly to a system for identifying and processing the graphic characters contained on a visible information display surface or panel, such as a license plate, by holographic techniques.

The large numbers of vehicles on today's highways make searching for a particular vehicle by law enforcement agencies difficult and time consuming, consequently imposing strenuous demands on the highly trained but limited manpower of these agencies. Yet statistics show that not only are automobiles frequently stolen for the purpose of facilitating commission of additional crimes, but presence of stolen vehicles on the highways themselves present a special traffic hazard. For example, in 1963 in the State of New York, there were 1,184 accidents involving drivers of stolen vehicles, resulting in 13 deaths. The necessity for improved capability of seeking out and apprehending drivers of stolen vehicles is thus plainly evident. Utilization of automatic means for seeking out stolen vehicles, and police officers only for making arrests in these cases, represents a desirable way for obtaining a much higher apprehension rate with less police manpower. The rapid processing capability and virtually instantaneous response to many simultaneous inquiries which may be achieved through electronic scanning of license plates by a computer controlled system can enable police officers to apprehrend readily persons driving stolen vehicles while they are temporarily detained at toll booths, stop lights, stop signs, or while traversing bridges, tunnels or limited access highways. It follows that such automatic license plate identification system would drastically reduce the incidence of auto theft without a concomitant increase in police manpower.

The system described herein concerns a method and apparatus for recognizing and processing the alphanumeric characters comprising a word contained on a display panel. As a typical example of one such system, the description is directed to a motor vehicle license plate identification system. Those skilled in the art, however, will immediately recognize the additional capability of this system for identifying graphic characters or symbols presented on any display surface wherein the characters or symbols are located in predetermined positions with respect to an identifying feature or features of the display, and this invention contemplates such equivalent systems as set forth within the scope of the appended claims.

In any license plate character recognition system there are two preliminary difficulties which must be overcome before recognition may begin. First, there is the problem that, among vehicles licensed in the United States, there may be as many as fifty automobiles bearing identical license plate numbers. This condition is due to the autonomy of the states in licensing motor vehicles therein, without regard to the possibility that the same groupings of license numbers are also being used in other states. Second, there is the problem of rapidly scanning the characters on the license plate image immediately after the license plate has been optically detected, so as to avoid garbling or entirely missing any alphanumeric characters when traffic is heavy and moving quickly. This must be accomplished even though the license plates may be mounted at different locations on different vehicles, and even though each vehicle may not be in exactly the same lateral position at the instant at which the license plate is optically detected. The present invention overcomes the first problem by detecting only license plates of a given state, such as New York. The second problem is overcome by fine-scanning the optically monitored area of a plane on which recognition signals may be received until an image corresponding to a license plate of the given state has been detected, at which time the scanning is made coarse. This is made possible because license plate characters, by their uniformity of position, may be found only at known predetermined locations thereon, which can be immediately determined by the electron beam. The net result therefore, is that once a license plate of the given state has been detected, the characters thereon may very rapidly be identified.

The system described herein is best adapted to scanning a vertically-mounted license plate, so that characters thereon may be read regardless of the license plate location on the scrutinized side of the vehicle, preferably the rear. However, it is also possible to scan only those license plates mounted within a given area, such as a three-foot square. Since such conditions are applicable in the case of almost all automobiles presently on the highways, this feature could be utilized for identification of automobile license plates only.

The recognition system of the invention has inherent capability for accepting characters of different size. However, by limiting the search to characters of uniform size, the need for a scale search is obviated. Since it is possible to record an image of the abovementioned three-foot square area of the automobile at a fixed distance from a television pickup camera, a uniform character size can be maintained, permitting the system to function in a much simpler manner.

The recognition system, in one embodiment, is operatively enhanced by use of the monochromatic light emitted by a laser, such as a gas laser. This high degree of monochromaticity permits operation of a coherent light processing system with ability to recognize one or many patterns simultaneously, without need for scanning the characters, and without requiring complex logic circuitry in order to determine which character was recognized. The recognition is substantially instantaneous, and results in an electrical signal which may be easily processed.

In another embodiment of the system, mechanical presentation of a series of filters for separate characters is utilized. This avoids the necessity of constructing a multiple filter, as employed in the first embodiment. Thus, the system requirements are highly flexible and may be correlated with the requirements of individual installations.

The system of the instant invention employs holographic spatial filters to achieve character recognition. Such filters have been used to preferentially transmit light images of a desired shape or size, and are generally installed in an optical system at a location where the image information is chiefly in the form of diffracted light originating from a source of coherent light, such as a gas laser. For example, holographic spatial filters have been employed in the recognition system of J. M. Holeman and C. Q. Lemmond, application Ser. No. 492,187, filed Oct. 1, 1965, and assigned to the instant assignee.

Accordingly, one object of the invention is to provide a character recognition system for rapidly identifying the individual characters on a display panel and transmitting the identity of the characters to a central data processing location.

Another object of the invention to provide a high-speed license plate character recognition system which detects and identifies the individual characters of each scrutinized license plate for a predetermined licensing jurisdiction.

Another object of the invention is to provide a system for automatically reading characters of a license plate mounted on a vehicle, independent of both the relative position of the license plate on the vehicle and the lateral position of the vehicle on the roadway.

Another object is to provide a highly selective system for optically recording the characters of a license plate in the form of spots at predetermined locations on a readout plane, and thereafter converting the spot locations into digital data for use by a data processing unit.

Briefly, in accordance with a preferred embodiment of the invention, there is provided a system for identifying a display of graphic characters comprising optical means for substantially instantaneously producing an image of said display, a source of substantially coherent light, and spatial filter means. Means are also provided for directing a beam of this light onto the image produced by the optical means in order to impinge the light on the spatial filter means. The system further includes detecting means responsive to light energy in the form of spots at predetermined locations on the detecting means, and means responsive to the detecting means for converting the spot locations into signals bearing a relationship to these locations.

In accordance with another preferred embodiment of the invention, there is provided a method for identifying a display of graphic characters comprising the steps of detecting a display of graphic characters at a predetermined location, substantially instantaneously producing a transparency bearing an image of the display, transmitting a beam of substantially coherent light through the transparency to a spatial filter, imaging onto a viewing plane the light diffracted by said filter, and converting the positions of the light imaged onto the viewing plane into data signals representative of these positions.

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

Figure 1:
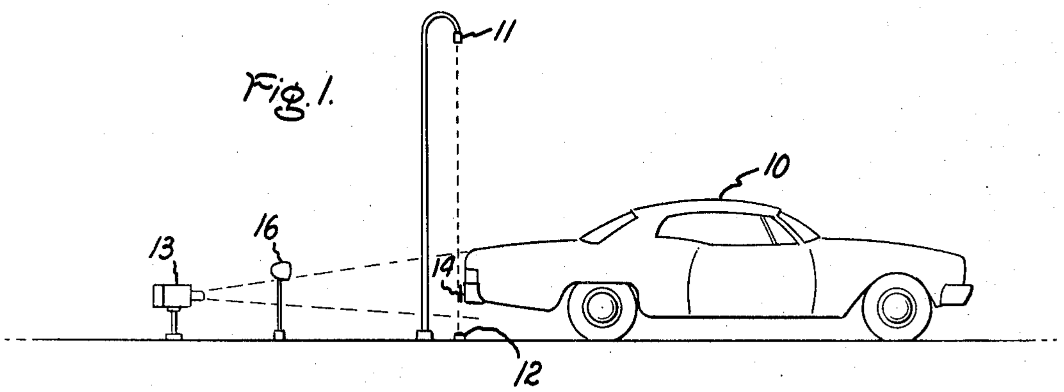
FIG. 1 is a side view of the system including means for detecting the rear of a vehicle so as to ensure proper positioning of the license plate thereon with respect to the viewing means.

In FIG. 1, an automobile 10 is depicted as having just passed through a beam of light indicated by a dotted line and directed from an overhead source 11 to a photosensitive detector 12 situated on the roadway, preferably about midway between the wheels of the vehicle. The license plate 14, which is usually mounted close to the rearmost portion of the vehicle, is viewed by the vidicon tube of a television camera 13. Since the system contemplates separate detecting means and separate viewing means for each lane of traffic, the vidicon camera tube is preferably of the high persistency type known as storage vidicons, so as to enable temporary storage of the image viewed by the camera. This feature permits use of a plurality of detectors and a plurality of viewers with but a single optical processing system. This is most advantageous at locations such as toll barriers, wherein the stream of traffic is divided among a large number of lanes, each lane being associated with a toll gate at which each vehicle in the lane must, at least momentarily, halt. However, by utilizing high-speed flashes of light from a source 16 to illuminate the license plates, it is possible to scrutinize license plates of rapidly-moving vehicles. During daylight hours, a high-speed shutter over the lens of the television camera is sufficient for obtaining a clear image of the license plate, regardless of vehicle speed, without artificial illumination. On the other hand, the image can be enhanced by use of flashlamps even during daylight hours, since the embossed characters on license plates create shadows which provide additional information if the illumination is always produced from a fixed location.

The detector and its source of illumination may be mounted, if desired, to direct a horizontal beam of light across the path of the vehicle. The license plate is viewed by the television camera after the beam of light again impinges upon the photoelectric detector after having been once interrupted by passage of the vehicle through the beam. However, the system is not limited to photoelectric detection, since other means for detecting passage of the rear-ends of vehicles may also be utilized. For example, a treadle or air-hose on the roadway, which responds after the second pair of wheels on the vehicle had passed thereover, is also suitable for actuating the system.

Figure 2:
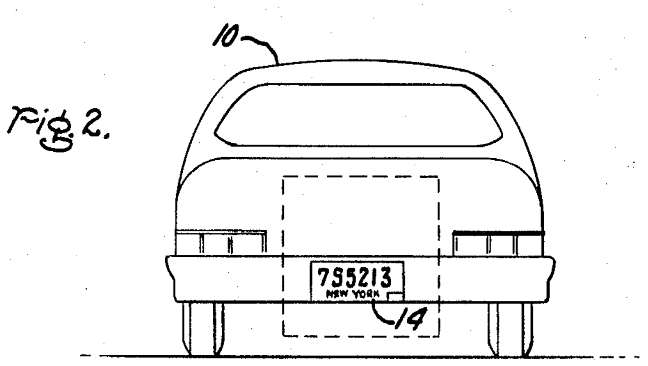
FIG. 2 is an illustration of the area scanned by the system when it is desired to detect only automobiles.

FIG. 2 illustrates, within the region bounded by a dotted line, the area to be scanned by camera 13 of FIG. 1 in order to scrutinize license plates of automobiles only. Since this area is determined by the lenses on camera 13, the area can be expanded, if desired, so as to allow the camera to scrutinize the license plate on every vehicle passing the camera.

Figure 3:
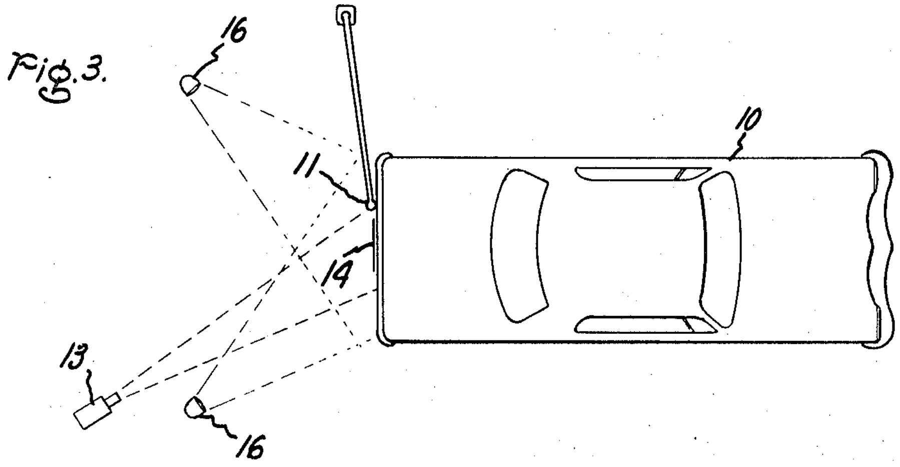
FIG. 3 is a plan view illustrating placement of illumination means and video image detecting means in relation to a vehicle to be scrutinized.

FIG. 3 is a plan view illustrating placement of camera 13 and a pair of flashlamps 16 in relation to automobile 10 undergoing observation. The exact placement configuration depends upon the conditions of traffic; for example, expected speed at the point of observation, spacing between vehicles, roadway curvature and grade, number of lanes, etc. Optimum placement of apparatus, therefore, will necessarily be different for different installations. The field of view of the camera is indicated by dotted lines, while the light from flashlamps 16 is indicated by solid lines emanating therefrom.

Figure 4:
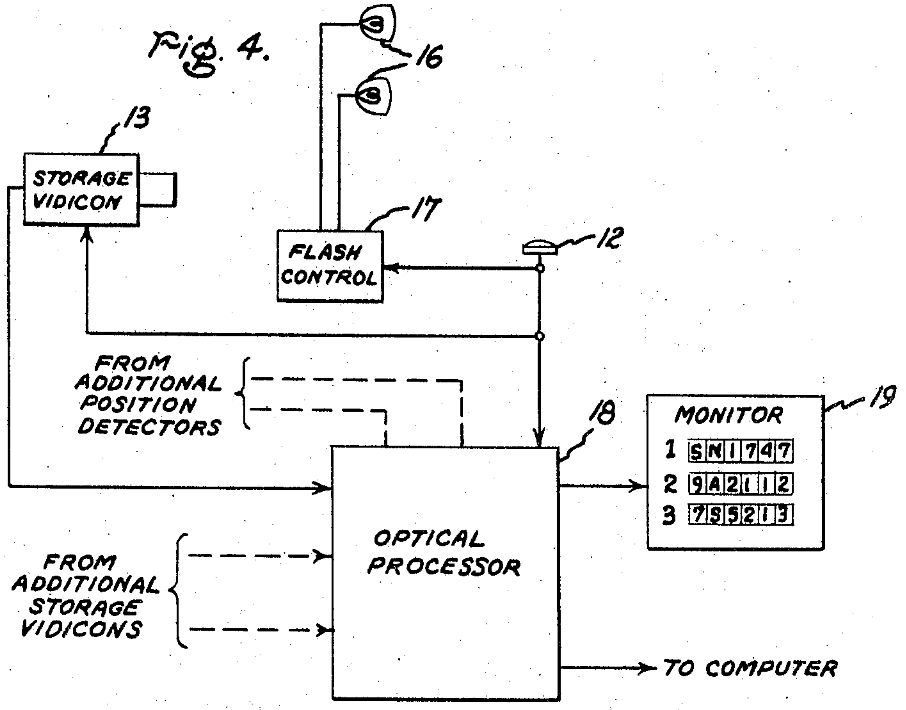
FIG. 4 is a general block diagram used to aid in describing the invention.

FIG. 4 illustrates the interrelationship between vehicle position detecting means 12, flashlamps 16 and storage vidicon 13. Flashlamps 16, preferably of the xenon variety, are operated synchronously with vehicle position by a flash control circuit 17, which is triggered by position detecting means 12. Storage vidicon 13 is also triggered by position detecting means 12 so as to register an image of the rear of the detected vehicle, which is illuminated momentarily by flashlamps 16. Under daylight viewing conditions, flashlamps 16 may be disconnected from the system; however, under any viewing conditions, it may be desirable to cover the vidicon lens with a color filter so as to highlight the color contrast between the license plate background and the characters thereon. Moreover, by covering the flashlamps with color filters, the color contrast may be highlighted under nighttime or otherwise dark viewing conditions, while also rendering the light flashes less apparent to motorists.

Output of storage vidicon 13 is applied to an optical processor unit 18 which responds also to position detection signals from other position detectors situated at the same general location, such as at other traffic lanes all located at a single toll station. In addition, signals from the additional storage vidicons associated with the additional position detectors in the general area are also supplied to optical processor 18. Output signals from optical processor 18, which represent license plate characters in pulse coded fashion, are supplied to a central computer (not shown) via a telephone or radio link. The central computer, which is preferably of the time-sharing type, compares the alphanumeric words of the scrutinized license plates with data stored in its memory bank and, upon detecting word coincidence, actuates an alarm at predetermined locations and transmits thereto the particular license plate word which has caused the alarm to be actuated. Obviously the task of law enforcement agencies in locating stolen vehicles is thus greatly simplified. Further, the output of optical processing unit 18 may be locally monitored on a digital display unit 19 at the remote location, so as to achieve wider dissemination of the scrutinized license plate words.

Figure 5:
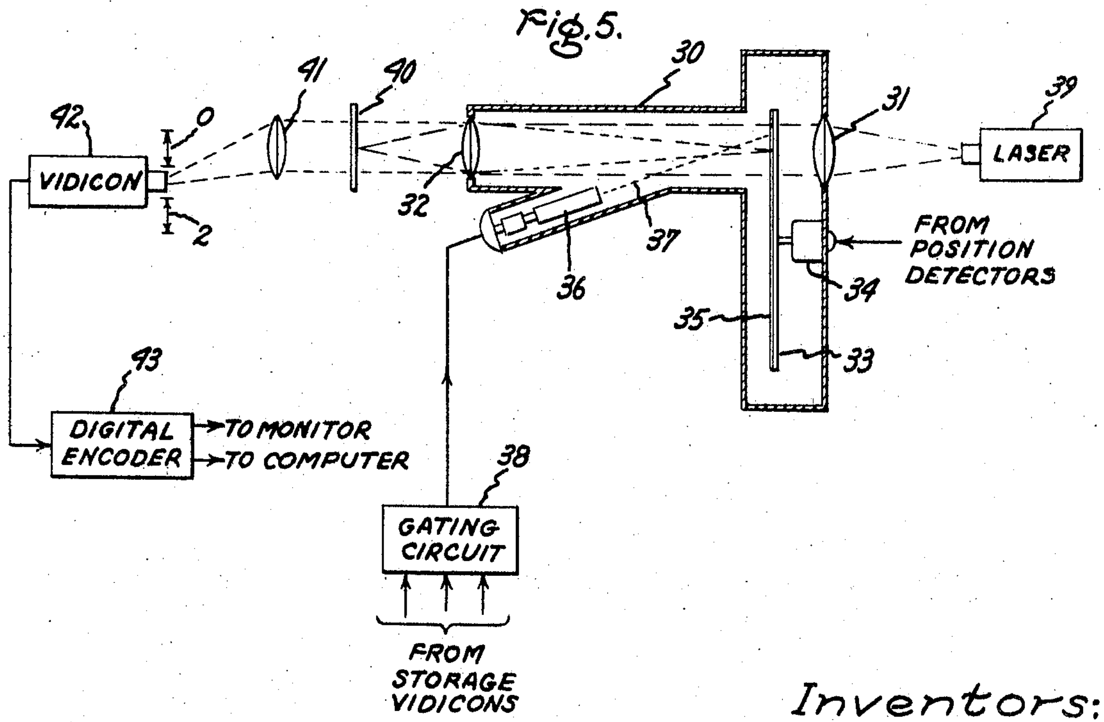
FIG. 5 is a schematic diagram illustrating one embodiment of the invention.

FIG. 5 is a schematic illustration of one embodiment of the optical portion of optical processor unit 18 shown in FIG. 4. The optical system comprises a sealed, evacuated optical transmission unit 30 including a pair of lenses 31 and 32 situated at either end of the unit and a transparent disc 33, driven by a stepper motor 34, situated within the unit. The disc is coated with a transparent liquid deformable medium 35 of low volatility, which exhibits substantially constant viscosity and low gas evolution when irradiated with high energy electrons. Substances of this type may comprise, for example, butylesters of methyl - $\beta$ - carboxyethyl siloxanes, beeswax, methyl silicone fluids, or materials such as disclosed and claimed in J. F. Klebe, Pats. 3,125,636 and 3,125,637, both of which issued on Mar. 17, 1964 and are assigned to the instant assignee.

Optical transmission unit 30 is constructed so that light passing through lenses 31 and 32 must also pass through transparent disc 33 and its coating of deformable medium 35. In addition, an electron gun 36 which produces a modulated electron beam 37 is situated so as to direct the electron beam onto the surface of deformable medium 35. The electron beam is capable of being deflected to scan a rectangular raster over the surface of deformable medium 35 by electron deflection means (not shown) which are well-known to those skilled in the art. Stepper motor 34 is driven in response to signals from position detecting means 12, shown in FIG. 4, while electron beam 37 is controlled in accordance with signals supplied from storage vidicons 13, illustrated in FIG. 4, through a gating circuit 38 which permits control of the electron beam by only one storage vidicon at a time. The beam produced by electron gun 36 may be intensity modulated by application of signals from gating circuit 38 to a control grid (not shown) located between the electron gun and deformable medium 35.

A source of coherent light, such as a laser 39, is situated to emit a beam, either pulsed or continuous, of spatially and temporally coherent light through lens 31, transparent disc 33 with coating 35 thereon, and lens 32, as indicated by dashed lines. Laser 39 may be of the gas or solid-state variety. Light exiting from lens 32 impinges upon a spatial filter 40. This filter contains a plurality of diffraction patterns corresponding to those produced by all of the alphanumeric characters which might be expected to appear upon a license plate of a given state, such as New York. Light transmitted through spatial filter 40 is focused by a lens 41 onto the image plane of a vidicon tube 42, such as is utilized in conventional television cameras. Output of vidicon tube 42 is converted to a digital code by a digital encoder unit 43, from which output signals representing alphanumeric characters monitored on any selected license plate by storage vidicon 13, as shown in FIG. 4, are transmitted to a centrally located computer, and to a local monitor if desired.

It should be noted that when the spatial filter is placed in coherent light, part of the light is transmitted through the filter to form a normal representation of the source image on medium 35. This representation, designated the "zero order" image, falls within a planar area centered on, and perpendicular to, the optic axis of the system. The optic axis comprises the center portion of the beam transmitted from laser 39 through lenses 31 and 32.

In addition to the zero order image formed by light transmitted through the filter, several diffraction images are formed by light which is deviated by the filter. Thus, a first order image is formed next to the zero order image in the same plane thereof, a second order image is formed next to the first order image in the same plane thereof, etc. In FIG. 5, vidicon 42 is depicted as viewing the first order image, while the zero order and second order image positions are indicated by two-headed arrows designated 0 and 2, respectively.

In the first order image plane, each alphanumeric character on deformable medium 35 which is detected by spatial filter 40 produces a spot of light corresponding exactly to the geometric center of the location of that character on medium 35. The spot locations form a geometric pattern on the face of vidicon tube 42 which may then be converted to digital data corresponding to the alphanumeric word on the detected license plate.

When a storage vidicon tube scrutinizes a license plate, the image formed on the face of the storage tube 13 is scanned by an electron beam within the tube in a manner conventional to the television art. The image on the face of the storage vidicon tube is then transmitted through gating circuit 38 to optical transmission unit 30, wherein the image picked up by the storage vidicon is reproduced onto deformable medium 35 by the action of electron beam 37 thereon. The amplitude of deformations in the surface of the deformable medium are a function of the number of electrons delivered from the beam at the various points on the surface of the medium. Consequently, the amplitudes of these deformations are a function of the signal modulating the electron beam. Systems of this sort have been utilized in projection television systems.

The deformations in medium 35, as described in the aforementioned Klebe patents, phase diffract the light from laser 39 through spatial filter 40, which acts as a diffraction grating, so as to produce an intensity which corresponds to the amplitudes of the deformations and thus the amplitudes of the video signal modulating electron beam 37. Hence, the image written onto deformable medium 35 corresponds to the license plate image detected by storage vidicon 13 of FIG. 4. When the next license plate has been detected, a signal from the actuated position detector operates stepper motor 34 to rotate disc 33 so as to bring a nondeformed sector of medium 35 into the path of the light generated by laser 39. The previously deformed portion of deformable medium 35 is thus moved out of the path of electron beam 37, and the charge acquired by the deformed portion of medium 35 under the action of electron beam 37 begins to decrease. This causes the deformation to subside. The revolution rate of disc 33 is such that sufficient time is allowed for the charge acquired by the deformed sector of medium 35 to die away before once again moving into the path of the coherent light.

When a license plate image is produced on deformable medium 35, spatial filter 40 transmits light diffraction patterns in accordance with the characters on the deformable medium. The light transmitted by spatial filter 40 is imaged by a lens 41 onto the surface of vidicon tube 42. Because a plurality of alphanumeric characters are present in each license plate image, a plurality of diffraction patterns are passed by spatial filter 40 to lens 41, which focuses each of these diffraction patterns to a spot. The position of each spot depends upon the particular diffraction pattern producing the spot and the location of the character in the license plate image which initiates the spot, so that each character produces a spot in a unique location. The reason for displacement of the spots in accordance with the particular diffraction patterns is described in detail in the aforementioned Holeman et al. application, Ser. No. 492,187, filed Oct. 1, 1965.

By scanning the face of vidicon tube 42, the positions of the various spots on the face of the tube can be determined. This determination is made by converting the scan time of the vidicon tube to position information for each spot detected on the face of the tube. The spots are also positioned in accordance with the position of the characters on the license plate; therefore, by moving the scanning beam across the face of the vidicon tube, the spots are encountered in an order corresponding to the position of the characters on the license plate. This information is used to determine the order of occurrence of the detected characters. The scanning parameters associated with the electron beam in vidicon tube 42 are converted into a digital code by digital encoder 43, from which information as to detected license plates is supplied to a central computer and to a monitor if desired.

Figures 6A, 6B:
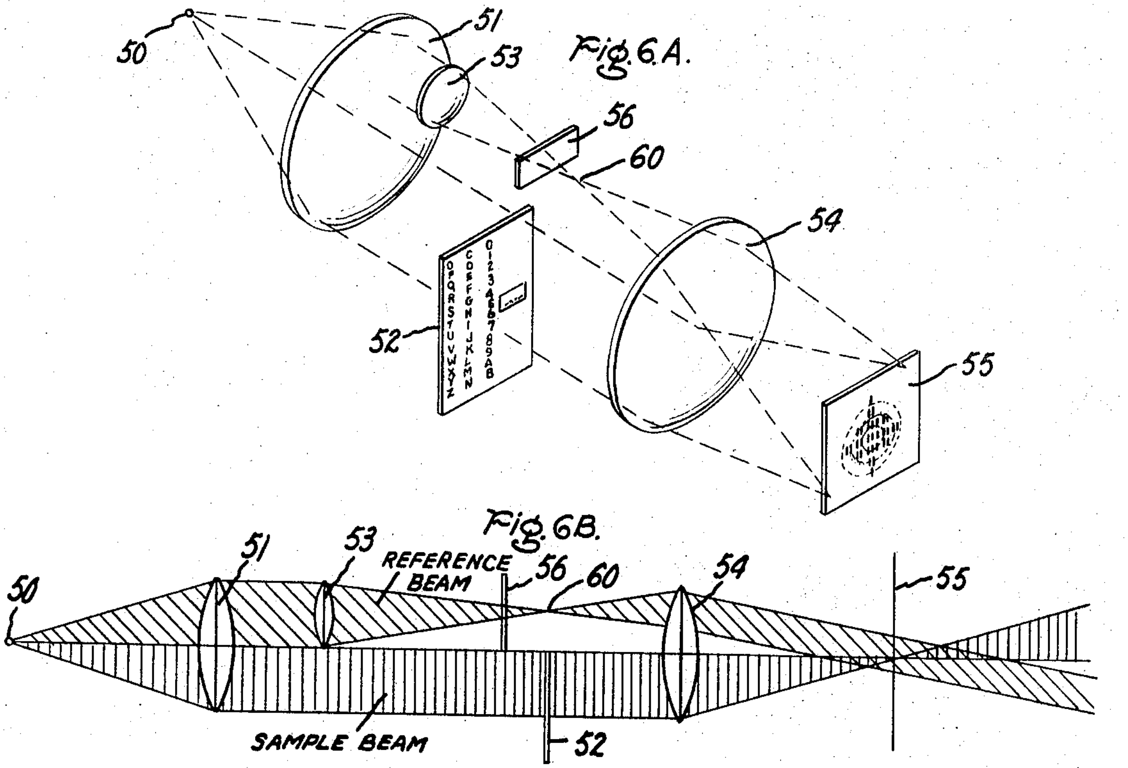
FIG. 6A is a schematic illustration of an optical system for producing a spatial filter for use in the system of the invention.
FIG. 6B is a plan view of the system of FIG. 6A.

FIG. 6A is a schematic diagram of the optical portion of a system for fabricating holographic spatial filters suitable for use in the character recognition system of the instant invention. This optical system, which is described in detail in the aforementioned Holeman et al. application, Ser. No. 492,187, generally comprises a point source of monochromatic light 50 preferably originating from a gas laser of conventional type, such as a commercially available helium-neon gas laser. The laser produces a collimated beam of coherent light, indicated by dashed lines, which may be focused at the point 50 by a suitable lens (not shown) to a diameter on the order of one one-thousandth of an inch or less. This focus point then becomes a point source for the system, and, if desired, can be more precisely defined by passing the light through an apertured plate wherein the hole is about the same size as the image of the source at the focus. While light from point source 50 is preferably produced by a helium-neon gas laser suitably focused and apertured, it is also feasible to employ other suitable monochromatic light sources. For example, a filtered mercury vapor arc gas discharge could be used in place of the laser, as well as some other suitable gas discharge source. However, for most purposes the use of a laser is to be preferred.

Light from point source 50 is incident upon a lens 51 which serves to collimate the coherent light and direct part of it, referred to as the sample beam, onto an input plane 52. A second part of the collimated beam of coherent light is directed through a lens 53 which thereby establishes a reference beam. Transparency 52 and the focus 60 of the reference beam from lens 53 should be in the same plane perpendicular to the axis of the collimated beam. The record of the process, which becomes a holographic spatial filter, is made at the focus of a lens 54 on a recording medium illustrated at 55.

The input plane comprises a transparency of alphanumeric characters preferably arranged in three columns, with the characteristic outline of a license plate of the State of New York, containing the characteristic words "New York" above the lower border of the license plate, situated alongside the three columns of characters. Light transmitted through input plane transparency 52 is directed through the second lens 54 which focuses the sample beam onto a suitable recording medium 55 located at what is known as the frequency or filter plane. In addition to the sample beam, the reference beam of coherent light projected through lens 53 is also directed by lens 54 onto recording medium 55. Recording medium 55 may comprise any fine grain emulsion, such as the extremely fine grain spectroscopic emulsion known as Type 649–F, sold by Eastman Kodak Company of Rochester, N.Y. It should be noted that the reference beam is passed through an optical attenuator 56, such as an Eastman Kodak neutral density filter, also available from Eastman Kodak Company. In the alternative, a polarizing film which may be rotated in relation to the natural polarization of the beam of a laser in order to effect the desired degree of optical attenuation, may be employed as attenuator 56.

After exposure in the apparatus of FIG. 6A, the emulsion of recording medium 55 is developed by the well-known silver photographic process, resulting in the production of a holographic spatial filter described in considerable detail in Spatial Filtering in Optics by E. O'Neill, IRE Transactions on Information Theory, volume IT–2, Number 2, June 1956, page 56, and Signal Detection by Complex Spatial Filtering by A. Vander Lugt, IEEE Transactions on Information Theory, volume IT–10, Number 2, April 1964, page 139. However, as used in the present specification, the term "holographic spatial filter" means a filter which preferentially transmits light images of predetermined desired shapes or sizes. The filter is used in coherent light, and is installed in an optical system at a position where the image information is chiefly in the form of diffracted light.

The action of a spatial filter can be explained by regarding the image in terms of its spatial frequencies, or by breaking down the resolution elements into black and white bar charts. Thus, the detail of an object is analyzed by comparison to detail in a bar-type resolution chart. For example, if 1/4 inch wide straight lines were the object, then the problem of resolving these lines is similar to resolving a target with alternate 1/4 inch light and dark bars. It is then said that the spatial frequency of the object (the lines) in the object space is 4 per inch. If the image is reduced 100 times by a lens, the spatial frequency of the image would be 400 per inch.

The bar charts have equally spaced elements and can be analyzed as gratings having the same grating spacing or spatial frequency. The object is considered to be made up of a number of grating elements: fine gratings representing the high spatial frequencies or fine detail, and coarse gratings representing the low spatial frequencies or coarse detail. In a diffracting system, fine gratings disperse light at large angles and coarse gratings disperse light at small angles. Therefore, it is possible to make a spatial frequency discrimination filter by limiting the dispersion angle of the light passed through the filter. This, in effect, is how the holographic spatial filter functions to selectively pass light images of a desired shape and size. The method by which a holographic spatial filter is fabricated, is briefly described below.

Light diffracted by transparency 52, after passing through lens 54, is combined with coherent light from the reference beam in such manner that both the amplitude and phase of the diffracted light are recorded. The amplitude primarily controls blackening of the emulsion on recording medium 55, while the phase of the diffracted light is recorded as variations in the pattern of interference with the reference beam. This recording, when photographically developed, becomes what is designated a "complex spatial filter," the term "complex" meaning that the filter contains both amplitude and phase information regarding the object or transparency 52. The recorded diffraction pattern obtained in this manner will transmit diffracted light from another object of the same size and shape as that which produced the recorded pattern, but not from objects having other shapes. Therefore, the spatial filter becomes a device for recognizing shapes or patterns. It is possible, however, to compensate for objects of the same shape as that which produced the recorded pattern, but a different size, by performing a scale search. One possible way of performing a scale search in a system such as shown in FIG. 5 would be to situate disc 33 between lens 32 and spatial filter 40. This would place the disc in converging light, enabling the scale of the hologram to be varied by axial translation of the disc. However, by scrutinizing license plates only at one predetermined location, the need for such scale search is avoided.

Because the sample beam in FIG. 6A is attenuated by the object which, in the case of small transparent characters on an opaque backing, amounts to a high degree of attenuation, the amplitude of the sample beam emerging from transparency 52 is considerably different from that of the reference beam emerging from lens 53. Since high contrast fringes result when the amplitudes of two interfering beams are substantially equal, it may be necessary to attenuate the reference beam by use of attenuator 56 which is situated fairly close to the focal point of short focus lens 53 to minimize the area of attenuator required in the beam. By attenuating the reference beam amplitude so as to substantially match the amplitude of the sample beam emerging from transparency 52, the desirable high contrast fringes are produced on recording medium 55. On the other hand, because it is also possible for the sample beam to have a higher amplitude than the reference beam due to the fact that the sample beam is focused in the plane of recording medium 55 while the reference beam is not, it may be necessary to attenuate the sample beam in a similar fashion instead.

FIG. 6B is a plan view of the system of FIG. 6A, wherein like numerals indicate like portions thereof. This diagram illustrates the interaction of the sample and reference beams, and the relative locations of the components in the system. Further detail and alternative methods for producing a high quality spatial filter 55 may be obtained from the aforementioned Holeman et al. application, Ser. No. 492,187.

Figure 7:
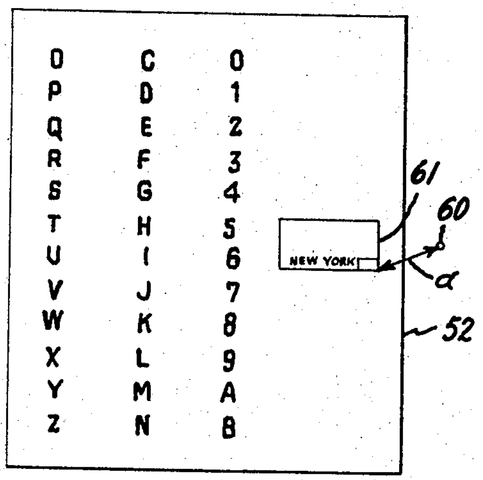
FIG. 7 is an illustration of a transparency from which a spatial filter employed in the system of the instant invention may be made.

FIG. 7 is an illustration of transparency 52, shown in FIGS. 6A and 6B in relation to the reference beam focus 60. The alphanumeric characters are arranged in any convenient order. To avoid a somewhat unwieldly long and narrow transparency, the alphanumeric characters may be arranged in three columns as illustrated; however, if preferred, a single column of alphanumeric characters may be utilized. A vector $\alpha$ indicates direction and distance from focus 60 to the lower right-hand corner of the license plate outline 61 on transparency 52.

Figure 8:
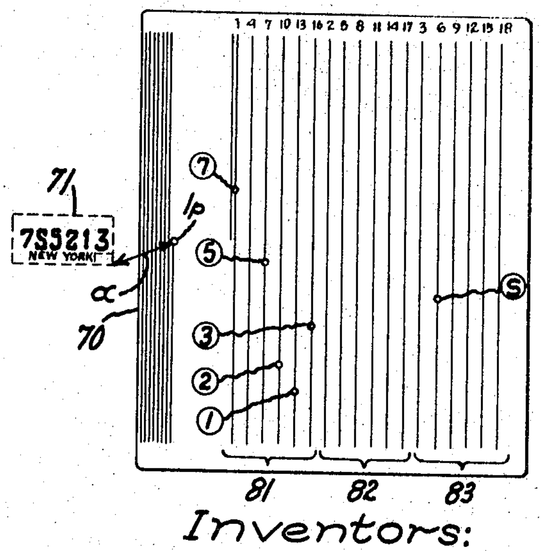
FIG. 8 is an illustration of spots formed on the surface of a readout vidicon tube due to passage of coherent light through a spatial filter fabricated from the transparency illustrated in FIG. 7.

FIG. 8 is a schematic illustration of the face of vidicon tube 42 of FIG. 5 when a license plate bearing alphanumeric word 7S5213 has been detected. In particular, outline 70 represents the face of vidicon tube 42, which is situated within the first order area of the recognition plane of the system of FIG. 5, while, for reference, the zero order image 71 of the detected license plate is shown situated within the zero order area of the recognition plane. Each of the spots shown on the face of the vidicon tube represents recognition of a particular alphanumeric character on the license plate scrutinized, with the exception of the first spot on the left-hand side, which represents recognition, preferably by detection of the characteristic license plate outline containing the words "New York" above the lower border thereof, of a license plate issued by the State of New York. This first recognition spot is designated 1$p$ while the remainder of the spots on the face of the vidicon tube are designated by encircled characters corresponding to the license plate characters which they represent. The recognition spot for each character, which is reconstructed by diffraction, occurs in the same place, with respect to the character producing the spot, that reference beam focus 60 had with respect to that character in the filter making process. As a result, the recognition spot for the license plate appears farthest left on the face of vidicon tube 42, all the numerals and letters A and B can occur only within a left-hand group of columns 81 on the face of vidicon tube 42, letters C–N can appear only in a middle group of columns 82 on the face of vidicon tube 42, and letters O–Z can appear only within a group of columns 83 in the extreme right-hand side of the face of vidicon tube 42. The vector $\alpha$ from zero order image 71 to recognition spot 1$p$ is identical to the vector $\alpha$ in FIG. 7.

The scanning sequence for vidicon tube 42 is illustrated in FIG. 8. Thus, a fine scan by an internal scanning electron beam is started at the left-hand side of the tube, and is continued until reference spot 1$p$ has been detected, at which time the fine scan is halted, and a partial coarse scan is initiated at a predetermined distance to the right of point 1$p$. The complete coarse scans then occur in the order designated across the top of face 70 of vidicon tube 42. Thus, during scan 1, which is the first complete coarse scan, numeral 7 is detected. This is followed in order by scans 2 and 3, since the face of the vidicon tube is scanned in all three columns for each character on the license plate. Therefore, even though the point representing the first alphanumeric character, 7, has been detected, the scan pattern for the first character continues through to completion.

After scan 3 has been completed, the scanning beam abruptly jumps back to the left, to a point displaced to the right of scan 1 by a fixed incremental distance. Scan 4 follows at this point, followed in turn by scans 5 and 6. During scan 6, character S is detected. This is the second character on the license plate, and accordingly is detected in a position displaced from scan 3 by the aforementioned fixed predetermined incremental distance. It should be noted that the coarse scan increments within each column of scans on the face 70 of tube 42 are all equal.

Vidicon 42 is next scanned to detect the third character, and consequently, in scan 7, which takes place to the right of scan 4 by the aforementioned incremental distance, the character 5 is detected. Scan 7 is followed in order by scans 8 and 9. Following scan 9, the scanning beam again jumps abruptly to the left and scans through position 10, in which character 2 is detected. Scans 11 and 12 therefore detect no character. Scan 13 then detects character 1, so that scans 14 and 15 detect no character. Scan 16 detects the final character 3, and is followed by scans 17 and 18 which consequently detect no character. At this point, the entire face of tube 42 has been scanned in triple-interlaced fashion, and each character in the observed license plate has been detected. Moreover, the spots have been detected in the order in which the characters they represent appear on the license plate, since the displacement of each character on the image of the license plate formed on disc 33 of FIG. 5 corresponds to its displacement by the optical system shown in FIG. 5.

The system, as described in greater detail infra, converts the time interval betwen the start of each trio of coarse scans comprising a single scan pattern and detection of a spot during that scan pattern, to position information, and correlates this information with an alphanumeric character. Moreover, once the license plate issued by a particular state, such as New York, has been detected, resulting in the fine scan of vidicon tube 42 intercepting point 1*p* on tube face 70, the scan may jump by a predetermined amount to begin the partial coarse scan. This is possible because the alphanumeric characters in the license plate word are uniformly spaced. Thus, for the largest size word, which for most states, including New York, comprises six characters, the first character on the license plate should occur at a predetermined location with respect to the words "New York" which produce spot 1*p* and which always appear in the same location on the license plate. Thus, because of the uniform positioning of the alphanumeric characters on the license plate, it is posible to merely scan coarsely the face of the vidicon tube for each of the alphanumeric characters once the initial (or partial) coarse scan has been positioned by the aforementioned predetermined amount from the fine scan in which reference point 1*p* is detected. In the event the alphanumeric word comprises less than six characters, no character is detected in those positions left vacant. This information also may be digitally encoded so as to enable transmission of a "blank" character to the central data processing location.

Figures 9, 10:
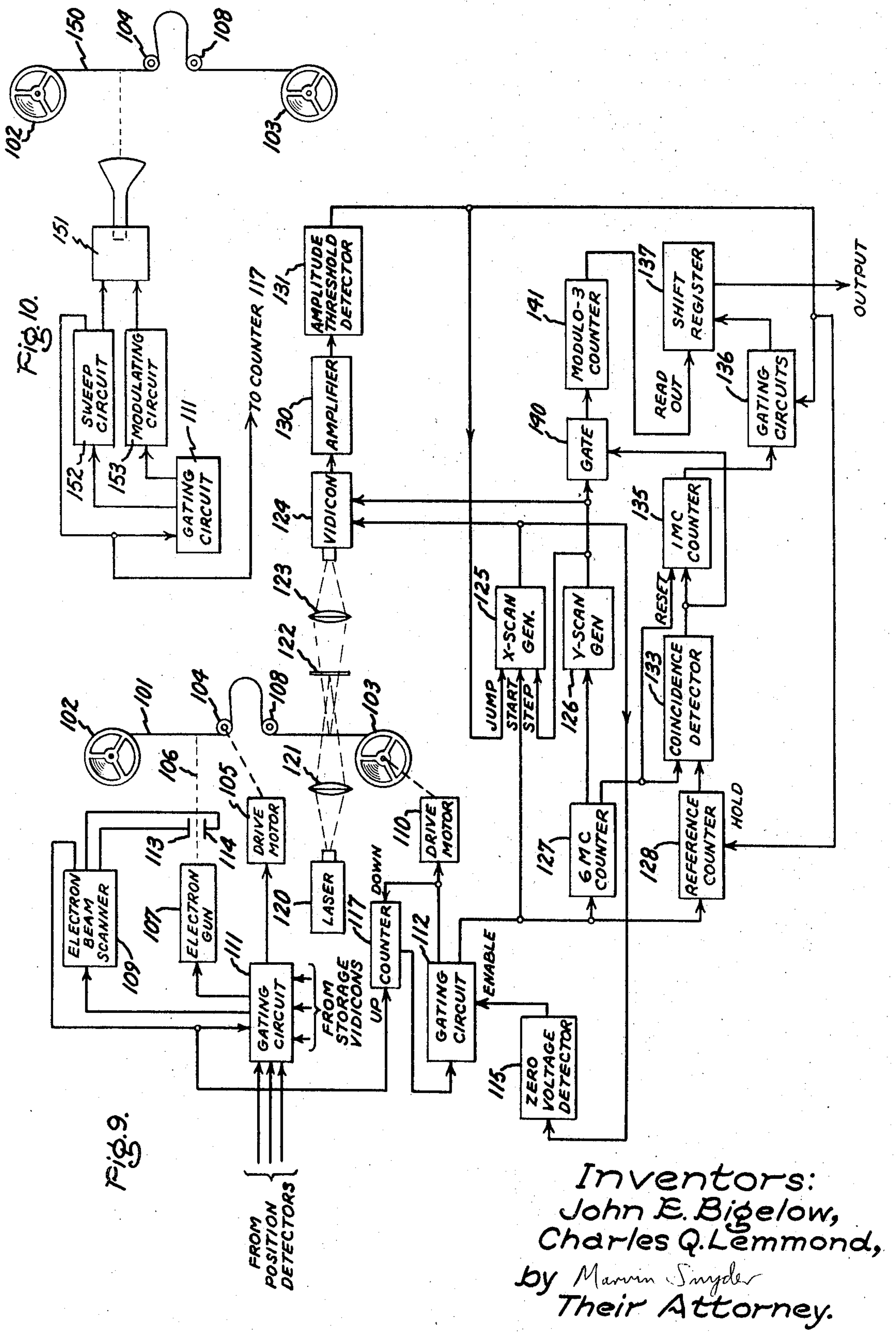
FIG. 9 is a block diagram of another embodiment of the invention.
FIG. 10 is a block diagram illustrating a modification of the embodiment of FIG. 9.

FIG. 9 is a block diagram of a system utilizing a thermoplastic medium for recording license plate images, showing the electronic circuitry which may be utilized for scanning the face of vidicon tube 42 of FIG. 5 in the triple-interlaced manner described in conjunction with FIG. 8. The medium for recording images in the system of FIG. 9 is a thermoplastic-coated film or tape 101, the surface of successive portions of which is converted by heating means (not shown) into a liquid state and moved past an electron beam 106 which is both deflected by deflecting electrodes 113 and 114 in response to signals from electron beam scanner 109 and modulated in accordance with applied input signals that are a function of the electrical signal transmitted from the storage vidicon sensing an image. The electrons of electron beam 106 are electrostatically attracted toward the rear of the film in order to produce depressions on the liquid surface, the depth of which depend upon the number of electrons or charge density at the respective points on the liquid surface. The surface of the film is thereafter cooled, or allowed to cool, to a substantially solid state in order to preserve the depressions therein and enable optical readout.

Thermoplastic-coated film 101 is shown in FIG. 9 threaded from a pay-out reel 102 to a take-up reel 103. A driving gear or capstan 104, driven by a drive motor 105, is utilized to pass the tape in front of an electron gun 107 so as to present a substantially level surface to electron beam 106 generated by electron gun 107. The tape contains a variable size loop extending between capstan 104 and an idler wheel or gear 108, so as to permit capstan 104 and take-up reel 103, which is driven by a drive motor 110, to operate at different rates or for different intervals without breaking or unduly stretching the film. Electron gun 107 and film 101 are enclosed in a vacuum environment within an enclosure (not shown), in the manner similar to that shown and described in W. E. Glenn, Jr., Pat. 3,113,179, issued Dec. 3, 1963 and W. E. Glenn, Jr., et al. Pat. 3,116,962, issued Jan. 7, 1964, both of which patents are assigned to the instant assignee.

Output signals from the vehicle position detector for each line are applied to the control terminals of a gating circuit 111. Similarly, output signals from the storage vidicon for each of the monitored lanes are supplied to the inputs of gating circuit 111. Hence, when the rear of an automobile in any particular lane has been detected, gating circuit 111 operates to connect the storage vidicon tube for that lane to electron gun 107 or a control grid (not shown) which influences the electron beam produced by the electron gun, and to electron beam scanner 109, for respectively modulating and scanning the electron beam produced by the electron gun. Thus, gating circuit 111 prevents more than one image from acting upon electron beam 106 at any given instant, avoiding the problem of "cross-talk" between images which would otherwise occur if information regarding more than one image were transmitted simultaneously to electron gun 107 or a control grid for modulating the beam produced by the electron gun, as well as electron beam scanner 109.

Drive motor 105 is driven from gating circuit 111, while drive motor 110 is driven from a gating circuit 112. Thus, motor 105 advances tape 101 past electron beam 106 after electron beam scanner circuit 109 completes one full raster scan for electron beam 106, provided another signal has been produced by one of the position detectors. In this fashion, images are rapidly recorded in succession on the liquid surface of the tape and, because of the temporary storage capability introduced by the loop in the tape between capstan 104 and idler wheel 108, the speed of recording can temporarily exceed that of readout if vehicles are detected over a period of time at a rate faster than that at which their license plate alphanumeric characters can be read out.

Due to the image retention capability of the storage vidicons at the pickup locations along the highway, input signals to gating circuit 111 from the storage vidicons are withheld from the input to the gating circuit until the system is ready to accept and record the image from the face of the storage vidicon. Transfer of the image from the vidicon is then accomplished by scanning the entire face of the vidicon once with the internally-produced electron beam of the vidicon, in response to energization of a scan circuit associated therewith through gating circuit 111.

Once the image has been recorded on thermoplastic tape 101, electron beam scanner 109 provides a signal both to gating circuit 111 which conditions the gating circuit to accept another image from a storage vidicon which has detected a license plate, and to the count-up input of an up-down counter 117. In addition, through output circuitry (not shown), electron beam scanner 109 produces an output signal which is applied to the storage vidicon from which information has just been received. This output signal initiates several complete scans of the face of the storage vidicon, thereby wiping out the image stored on the face of the storage vidicon. This enables the storage vidicon to accept a new image.

Up-down counter 117 has its count-up input connected to the output of electron beam scanner 109 and its count-down input connected to the output of gating circuit 112, so as to function as a comparison circuit. Thus, even when no input is received from any of the position detectors, if the total number of images which have been recorded exceeds the total number of output pulses which have been produced by gating circuit 112, gating circuit 112 will nevertheless actuate drive motor 110, provided an enabling voltage is received from a zero voltage detector 115, advancing take-up reel 103 so as to bring another frame containing an image on thermoplastic tape 101 into the path of the optical energy, indicated by dotted line, which is required for readout of the image. This condition continues to occur until an output signal of substantially zero, representing a count of zero, is produced by counter 117, indicating that each of the images recorded on tape 101 has been read out by the optical system. Only when the count in counter 117 is zero, is there no input signal applied from the counter to gating circuit 112. However, even the output of counter 117 must be conditioned by the output of zero voltage detector 115 in order to effect an advance by drive motor 110. Both drive motors 105 and 110 may conveniently be of the stepper motor type.

Readout is accomplished in a manner similar to that described in conjunction with the system of FIG. 5. Thus, a source of coherent light, such as laser 120, illuminates an image frame recorded on the cooled portion of tape 101, through a lens 121. A diffraction pattern of the image of this frame falls onto a spatial filter 122 on which are recorded diffraction patterns corresponding to the alphanumeric characters which may be expected to appear on detected license plates. A lens 123 images this frame as well as the recognition spots formed by diffraction by spatial filter 122, onto the plane of the sensitive surface of a vidicon tube 124.

Scanning of an electron beam in vidicon tube 124, in order to read out the information on the face of the tube, is accomplished in a horizontal direction by an x-scan signal generator 125 and in a vertical direction by a y-scan generator 126. The x-scan generator is started by an output signal from gating circuit 112 which simultaneously resets two counters 127 and 128. These two counters are operated at identical rates, such as 6 megacycles per second. Counter 127 controls the scanning rate of y-scan generator 126 by means of a digital-to-analog conversion wherein the y-scan generator converts the output pulses of counter 127 to an analog voltage. Since counter 127 operates continuously, the y-scan is controlled by the count supplied from the counter until a predetermined count is reached; at this time, the y-scan generator abruptly returns to its starting point and again begins another scan.

Upon completion of each y-scan, y-scan generator 126 supplies a voltage to x-scan generator 125 which advances the horizontal position of the electron beam in vidicon tube 124 by a predetermined amount. This is the amount between any two time-adjacent vertical scans as illustrated in FIG. 8; for example, scan 1 and scan 2, scan 8 and scan 9, or scan 15 and scan 16. To accomplish this pattern of horizontal scanning, the x-scan generator is programmed so as to advance by the predetermined amounts, as well as to advance from the area representing the possibilities of locating any character between letters O and Z back to the area representing the possibilities of locating any alphanumeric character between numeral 0 and letter B. The x-scan and y-scan generator output voltages are described in greater detail infra, in conjunction with FIGS. 10A and 10B.

Output signals produced by vidicon tube 124 are supplied through an amplifier 130 to an amplitude threshold detector circuit 131 which produces an output signal only when the output signal amplitude of amplifier 130 exceeds a predetermined level. The output of detector 131 is coupled to the input of x-scan generator 125 so as to cause the x-scan generator to abruptly move the beam horizontally through a predetermined distance on the face of vidicon tube 124. In addition, the output of amplitude threshold detector 131 is coupled to reference counter 128, in order to hold or transfix the count in counter 128 extant at the instant threshold detector 131 produces an output signal.

Output signals of x-scan generator 125 are supplied to the input of zero voltage detector 115. Detector 115 supplies an enable voltage to gating circuit 112 only whenever the output signal of x-scan generator 125 is zero; hence, during the time when x-scan generator 125 provides an output signal, gating circuit 112 is disabled and therefore insensitive to output signals from up-down counter 117.

Output signals from counter 127 are supplied to one input of a coincidence detector 133. A second input to coincidence detector 133 is fulfilled by output signals from reference counter 128.

Output signals from coincidence detector 133 are supplied to the input of a counter 135, which operates at a lower counting rate than counters 127 and 128. Typically, this rate may be 1 megacycle per second. Counter 135 is preferably of the type which produces output signals in parallel fashion and is permuted to operate through a complete sequence of coded alphanumeric characters. For example, a six-bit code would be sufficient to transmit all thirty-six alphanumeric characters shown in FIG. 7. However, for greater communications capability, a seven-bit code may be preferable. This code, which may be of a type similar to that suggested for general interchange of information among information processing systems, communication systems, and associated equipment, promulgated by the American Standards Association under the designation "American Standard Code for Information Interchange" (ASCII) is supplied through a plurality of gating circuits 136, in parallel, to the input of a shift register 137. Counter 135 is reset by an output signal from counter 127 when counter 127 is reset.

Coincidence detector 133 produces no output signal when counters 127 and 128 are reset, since both counters are thereupon simultaneously started and operated in coincidence. Counter 135 therefore remains in its reset condition. However, when the first spot on the face of vidicon tube 124 is encountered by the internally-generated electron beam scanning the face of the vidicon tube, threshold detector 131 provides a "hold" signal to reference counter 128. This condition causes anticoincidence of counters 127 and 128, resulting in an output signal from coincidence detector 133 which starts counter 135. This first signal produced by threshold detector 131 corresponds to spot **1*p* in FIG. 8, which indicates that a license plate of the desired state has been detected. This spot always appears at a predetermined distance on the face of vidicon tube 124 above the starting point of the y-scan; that is, assuming the y-scan operates from bottom to top on the face of the vidicon tube as shown in FIG. 8, point 1*p* always occurs at a predetermined distance above the level of the starting point of the y-scan. Hence, counter 135 is started from a reference count which corresponds to the count at which a coded output signal representing the numeral 0 is produced, less the number of counts required for the counter to count to the top level of the y-scan and make an abrupt return to the bottom or starting level of the y-scan. Hence, when the count corresponding to the starting level of the y-scan is reached by counter 135, the output of the counter is a coded numeral 0. At the next count produced by counter 135, the output is a coded 1, etc. The eleventh output of counter 135** is a coded A, the twelfth a coded B, the thirteenth a coded C, etc. The thirty-sixth output is a coded Z, while the thirty-seventh is again a coded numeral 0.

It should now be apparent that the reference count from which counter 135 is started is merely a count corresponding to a letter between O and Z, inclusive. For example, if the reference point **1*p* in FIG. 8 occurs at the vertical level of character T, then the first coded output of counter 135 will occur at the next character level U, which is when coincidence of counters 127 and 128 no longer exists. In this instance, counter 135 is started at its 31st count and operates through six complete cycles of vertical scan, or 18 actual vertical scans, plus six additional counts. It should also be noted that while coutner 128 undergoes its "hold" or transfixed condition, counter 135 is driven through coincidence detector 133 by counter 127 so as to remain synchronized with the vertical scan on the face of vidicon tube 124. Each time a spot is detected on the face of vidicon tube 124, threshold detector 131 produces an output which opens each of the gates in gating circuit 136, thereby admitting the instantaneous count of counter 135 into shift register 137**.

The output of coincidence detector 133 is coupled to the control terminal of a gate 140 which receives input signals in the form of pulses from y-scan generator 126. Output signals from gate 140 are applied, during the detected anticoincidence condition of coincidence detector 133, to a modulo-3 counter 141. This counter provides an output pulse after each scan pattern of three complete y-scan pulses has been received through gate 140 from y-scan generator 126, thereby triggering shift register 137 to read out the data stored therein. Output data supplied by shift register 137 may be communicated to a central computer over standard communication links. While readin to shift register 137 occurs in parallel fashion, readout may occur either in series or parallel fashion, depending upon what type of communication line to the computer is used. It should be noted that shift register 137, when fully loaded, contains digital bits corresponding to one of the alphanumeric characters on the license plate being read out. Thus, it is necessary to load and read out shift register 137 six times, in order to obtain complete data regarding a single license plate.

To briefly recapitulate operation of the system of FIG. 9, an image picked up by one of the storage vidicons is reproduced on thermoplastic tape 101 by electron gun 107 in response to the signal received from the storage vidicon. Upon completion of the reproduction, electron beam scanner 109, which controls scanning of electron beam 106, actuates gating circuit 111 to permit drive motor 105 to advance the thermoplastic tape so that another image frame may be recorded thereon. Readout is performed sequentially from thermoplastic tape 101 as the tape is advanced by means of drive motor 110. Motor 110 advances the tape in response to presence of a recorded but unread image from a previously detected vehicle, but only when the output voltage of x-scan generator 125 is at its zero or quiescent level.

The x-scan is begun in response to an output signal from gating circuit 112, as is the y-scan, and a spot on vidicon tube 124 corresponding to the reference image is first located by vertical fine-scanning. The x-position of the electron beam in vidicon 124 is then advanced a predetermined amount by amplitude threshold detector 131, and a vertical coarse scan of the face of vidicon tube 124 is begun. In addition, specially permuted counter 135 is started from a reference count upon detection of the reference spot designated 1*p* in FIG. 8.

Output of counter 135 is supplied to shift register 137 through gates 136 operated in response to detection of a spot on the face of vidicon tube 124. Upon completion of each three successive complete y-scans, counter 141 causes shift register 137 to read out the character stored therein. This character may then be transmitted to a central processing location.

It should be noted that tape 101 of FIG. 9 may, in the alternative, comprise a photoconductive thermoplastic film, such as shown and described in J. Gaynor application Ser. No. 79,260, filed Dec. 29, 1960, now Pat. No. 3,291,601, issued Dec. 13, 1966, and assigned to the instant assignee. In such case, the video image transmitted by the storage vidicons at the pickup locations along the highway must be optically reproduced by receiving means, such as a cathode ray tube, prior to being recorded on the tape. The tape then records the image reproduced on the receiving means, in a manner similar to that described in the aforementioned Gaynor application. This is schematically illustrated in FIG. 10, wherein a photoconductive thermoplastic-coated film 150 is shown on reels 102 and 103. This deformable film is given a uniform electrostatic charge by charging apparatus (not shown). Thereafter, light striking the film selectively discharges the film according to the pattern produced by the light. The now selectively charged film is developed by heating the deformable medium, with heating apparatus (not shown), thereby softening the medium. This allows the forces of the electrostatic charge to deform the medium in accordance with the charge pattern thereon. The deformable medium is thereafter cooled, or allowed to cool, to a substantially solid state in order to preserve the depressions therein and enable optical readout.

A scanning light source is provided in the form of a flying spot scanner cathode ray device 151 energized from a suitable sweep circuit 152 which is triggered into operation from gating circuit 111 under the same conditions described for electron gun 107 and electron beam scanner 109 of FIG. 9. The light beam emitted through suitable optics (not shown) from flying spot scanner 151, and indicated by a dotted line, is also modulated in accordance with input signals that are a function of the electrical signal transmitted from the storage vidicon sensing an image and which are supplied through a modulating circuit 153 from gating circuit 111. In this fashion, the sensed video image is reproduced and recorded on electrostatically charged tape 150 in the region situated between payout reel 102 and capstan 104. Upon cooling, the tape may be read out in the manner described in conjunction with the apparatus of FIG. 9, in the region between idler wheel 108 and take-up reel 103.

Figure 11:
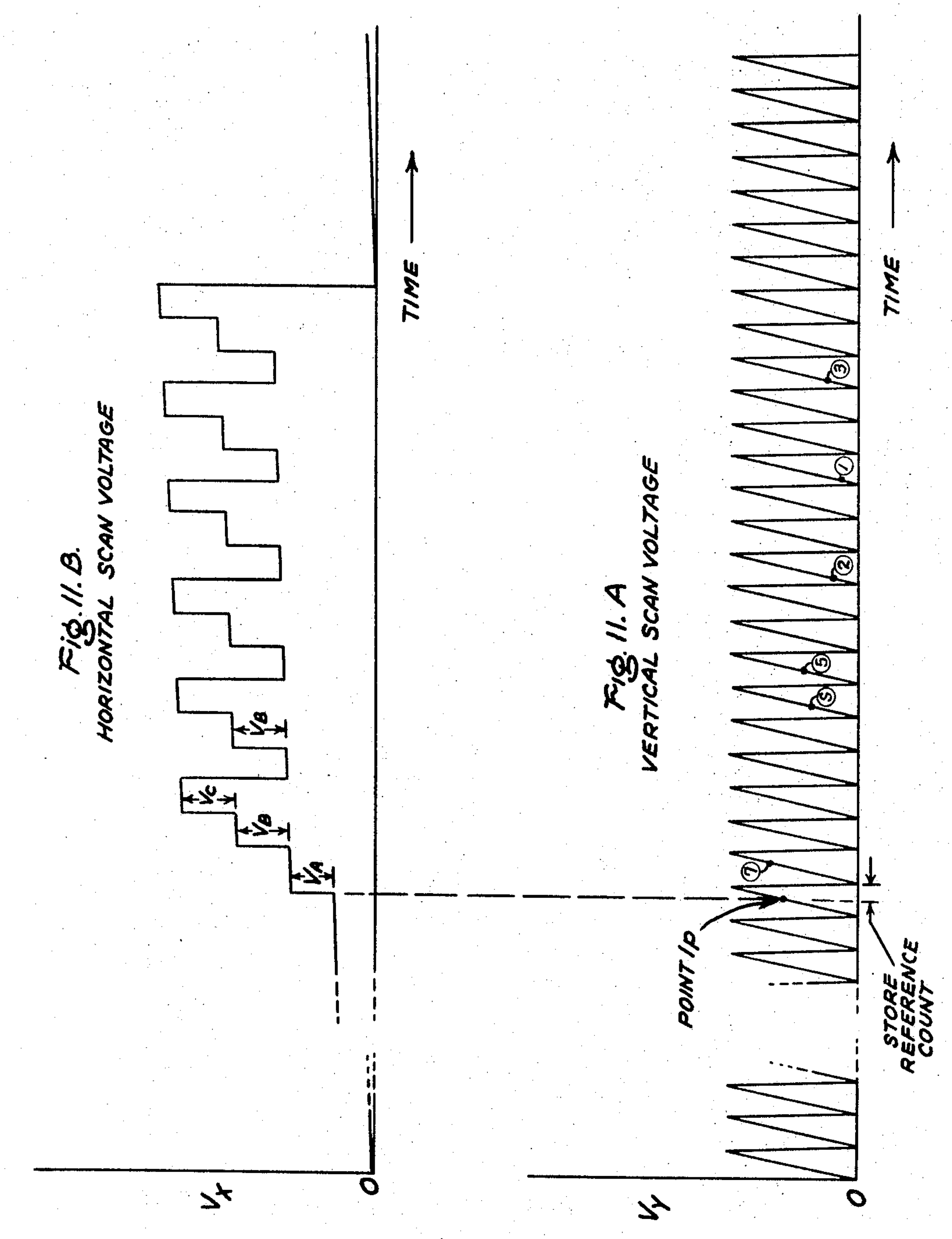
FIGS. 11A and 11B are voltage waveforms used in describing operation of the system illustrated in FIG. 9.

FIGS. 11A and 11B are waveforms of the vertical and horizontal scan voltages for vidicon 124 of FIG. 9. In particular, FIG. 11A illustrates the output voltage $V_Y$ produced by y-scan generator 126 of FIG. 9, showing where, on a time reference, voltages corresponding to the license plate bearing designation 7S5213 would occur. Each complete cycle of voltage $V_Y$ represents one complete vertical scan on the face of vidicon tube 124. Thus, the voltages generating vertical scans continue until point 1*p* on the face of vidicon tube 124 is detected. This point occurs at a predetermined amplitude on a cycle of voltage $V_Y$ determined by the position of the license plate image on thermoplastic tape 101. When point 1*p* is reached, counter 135 starts operating and, at the start of the next cycle, begins running through its sequence of alphanumeric characters. During the first cycle in this seqeunce, the spot corresponding to numeral 7 is located. No character can appear in the next two cycles, since the first license plate character has already been found. In the next series of three cycles, the character S is detected. This character is in the third cycle of the second complete series of y-scans, in accordance with the illustration in FIG. 8. The next four characters are then located in the next four series of three $V_Y$ voltages cycles respectively. Each of these four characters is located in the first of the three y-scan cycles in each series of cycles or scan pattern, since each of the four characters is a numeral. Upon completion of the eighteenth cycle after that in which reference point 1*p* has been located, all data regarding the recorded image has been read out and the system is prepared to accept a new image for readout.

In FIG. 11B, drawn to the same time scale as FIG. 11A, the horizontal scan voltage $V_X$ is illustrated. This voltage takes the form of a slowly rising sawtooth. The rate of rise of the sawtooth is controlled by counter 127. At the instant point 1*p* is located, a constant voltage $V_A$ is added to the sawtooth. Upon completion of the next full y-scan, a second constant voltage $V_B$ is added to the sawtooth, and upon completion of the next successive full y-scan an additional constant voltage $V_C$ is added to the sawtooth. Thus, voltage $V_A$ advances the internal scanning beam of vidicon 124 horizontally to the partial vertical scanning line and then the complete vertical scanning line designated 1 in FIG. 8, voltage $V_B$ further advances the internal scanning beam horizontally to the vertical scanning line designated 2 in FIG. 8, and voltage $V_C$ still further advances the scanning beam horizontally to the vertical scanning line designated 3. Upon completion of this third y-scan, voltages $V_B$ and $V_C$ are abruptly discontinued, and the internal scanning beam of vidicon 124 returns to the vertical sacnning line designated 4, in FIG. 8. At this juncture, the horizontal voltage is greater than the horizontal voltage in the first y-scan following detection of point 1p, by an amount determined by the rate of rise of the voltage $V_X$ sawtooth. This has the effect of producing the next vertical scan through the line designated 4 in FIG. 8, rather than producing another vertical scan through the line designated 1.

Upon completion of the y-scan through vertical line 4, the horizontal scan voltage is increased by an amount $V_B$, and line 5 is consequently scanned in a vertical direction. This sequence continues until all eighteen vertical scans have been completed. Upon completion of the eighteenth vertical scan, the horizontal scan voltage drops abruptly to its quiescent value, here shown as being 0. However, if another vehicle has been detected, counter 127 in FIG. 9 continues to operate, as illustrated in FIG. 11A, and the horizontal scan voltage sawtooth again starts to build up from its quiescent level.

Figures 12, 13:
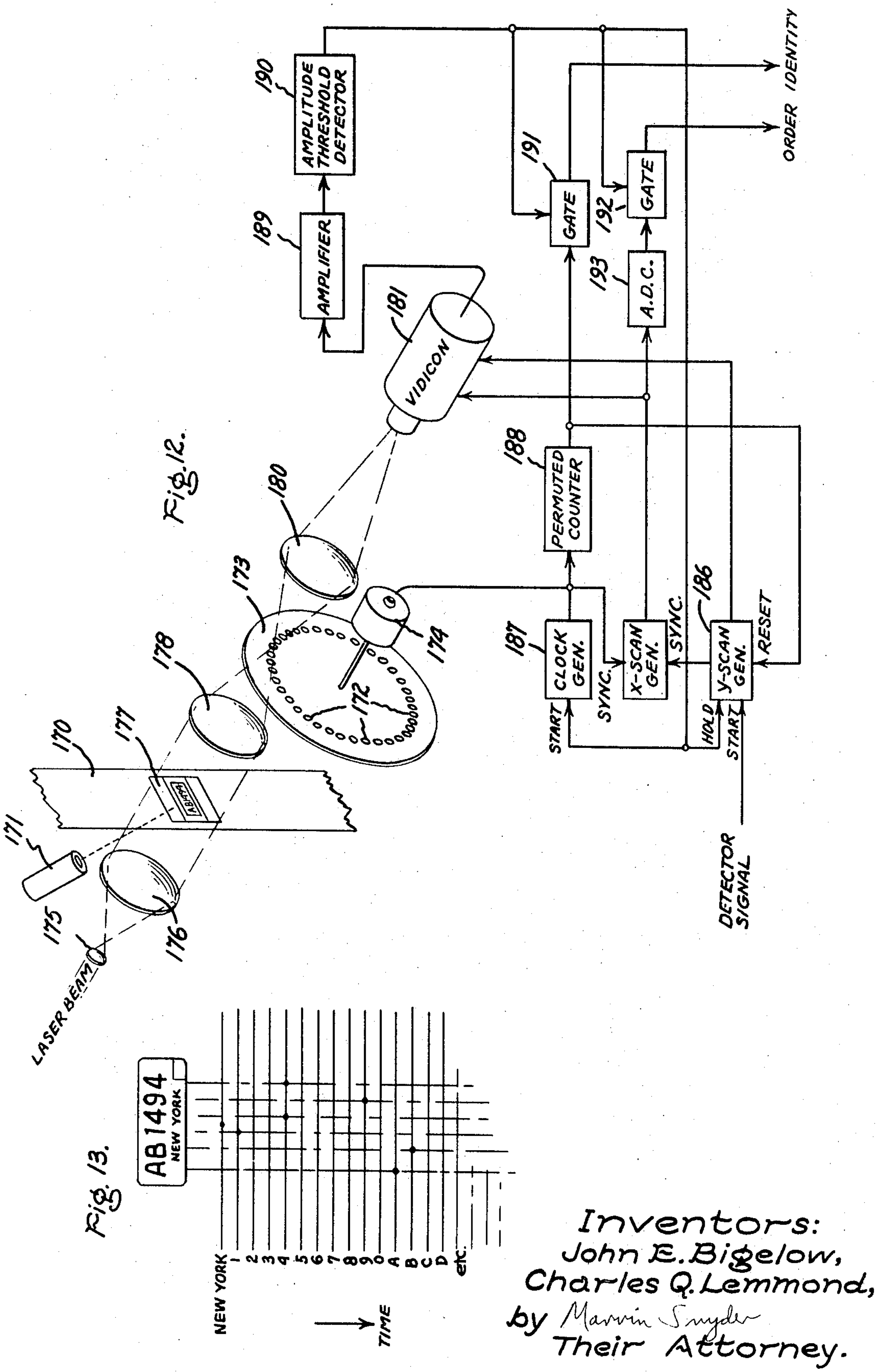
FIG. 12 is a schematic diagram of still another embodiment of the invention.
FIG. 13 is an illustration of spots formed on the image plane of a readout vidicon tube in response to a license plate detected by the system of FIG. 12.

FIG. 12 is still another embodiment of a system for reading alphanumeric characters on a display panel such as a license plate. In this system, a license plate image is recorded on a thermoplastic film 170 by means of an electron gun 171 and associated electronic circuitry (not shown), in a manner similar to that described for the system of FIG. 9. However, while spatial filter 122 of FIG. 9 contains diffraction patterns for all possible alphanumeric characters expected, the system of FIG. 12 instead utilizes a separate filter for each character. Each filter 172, of which there may be 37, is mounted on a spatial filter wheel 173, which is rotated by a stepper motor 174. A laser beam is widened through a lens 175 and collimated by a second lens 176 so as to pass through the entire image frame 177 of thermoplastic film 170. Here again, it may be sufficient to utilize a source of highly monochromatic light other than a laser, although the laser is a convenient and preferable way of producing this light. Light passed through image frame 177 is directed by a lens 178 onto the filters of wheel 173. Light transmitted through filters 172 is focused by a lens 180 to produce spots on the face of a vidicon readout tube 181. The face of vidicon 181 is preferably situated so as to respond only to first order images.

After the image has been recorded on thermoplastic film 170, the filter wheel begins its search by first rotating a filter with the characteristic locating feature, for example the words "New York," into the optic axis of the light beam. This is to locate the position of the license plate in the field of view. The face of the vidicon tube is then scanned with an electron beam originating within the tube so as to determine the exact location of the words "New York" on the license plate. Since the geometric positions of the various alphanumeric characters to be detected are related to the words "New York" as previously described, each of the characters may be accurately located on the face of vidicon tube 181. This permits the scanning system of tube 181 to operate in the manner described below.

Assume a license plate bearing characters AB1494 has been detected. A conventional video raster scan of the face of tube 181 is then employed to locate the spot corresponding to the words "New York." The filters are designed so that the recognition spots of the characters and the recognition spots of the words "New York" all fall at the same vertical level on the face of the tube. Thus, once the correct horizontal line for the "New York" recognition spot has been identified, the sweep is restricted to that horizontal line only, resulting in very simple repetitive scan patterns. Thereafter, all the character recognition spots occur on this horizontal line, so that as each filter is brought into position and held momentarily, the recognition spots occur one-at-a-time until up to six alphanumeric character recognition spots per license plate have been identified. Although the ordinal positions of the alphanumeric character recognition spots along the horizontal line are the same as their ordinal positions on the license plate, they occur in a random manner in time, as is illustrated in FIG. 13.

To read out the alphanumeric word of the detected license plate, each horizontal scan is digitized by means of a system somewhat similar to that shown in FIG. 9, so that the distance from the beginning of the horizontal sweep to the recognized character can be determined. For example, each of the horizontal lines of the scan in FIG. 13 actually represents the same line repeated in a time sequence as indicated by the arrow. Thus, the position of the filter wheel may be utilized for identifying the character recognized, and can be synchronized with initiation of system to convert the recognition signal into a digital signal. Further, by measuring time elapsed from the beginning of each sweep to a recognized character, the computing system can adjust the sequence of recognition so that the license plate alphanumeric word may be read out in proper order.

A system for providing this digital information is shown in FIG. 12. The electron beam in vidicon 181 is scanned by synchronized x-scan and y-scan generators 185 and 186 respectively. The y-scan generator is started and moves the scanning electron beam in vidicon 181 vertically across the face of the vidicon in response to a vehicle position detector signal. A specially permuted counter 188, which is similar to counter 135 of FIG. 9, along with stepper motor 174, are advanced in synchronism by a clock pulse generator 187 which produces a sequence of 36 output pulses each time it is started. In addition, x-scan generator 185 is synchronized with clock pulse generator 187 during the interval in which the clock pulse generator is operated, so as to generate one complete x-scan during each rest position of stepper motor 174 occurring during this interval.

Clock pulse generator 187 is started and y-scan generator 186 is simultaneously held or transfixed at its instantaneous vertical level when an output signal above a predetermined level, corresponding to detection of a spot, is provided by vidicon 181 through an amplifier 189 and an amplitude threshold detector 190. The vidicon output signal also controls a pair of gates 191 and 192. Gate 191 passs the output of permuted counter 188 in response to a vidicon output signal, thus providing a signal identifying the detected alphanumeric character. Gate 192 passes a digital signal representing a different one of six possibilities, from an analog-to-digital converter 193 driven in response to x-scan generator 185, so as to provide information regarding the order or position of the detected character in the alphanumeric license plate word. In this fashion, digital output signals representing the alphanumeric word if the detected license plate are provided. The thirty-seventh output signal of counter 188 may then be utilized to reset y-scan generator 186 in preparation for responding to the next detected license plate.

Although the system of FIG. 12 avoids the complexities of constructing a multiple filter and may produce more highly resolved images, it introduces mechanical motion which is not present in the multiple filter system. Thus, the particular choice of detection system may, in general, be dictated by the requirements of each individual installation.

The foregoing describes a character recognition system for rapidly identifying individual characters on a display panel, with capability for transmitting the identity of the characters to a central data processing location. The system may be used as a high-speed license plate character recognition system which detects and identifies individual characters of a license plate of a predetermined licensing jurisdiction. The system automatically reads characters of a license plate mounted on a vehicle, independent of the relative position of the license plate on the vehicle and the lateral position of the vehicle on the roadway, by recording the characters in the form of spots at predetermned locations on a readout plane, and converting the spot locations into digital data.

While only certain preferred features of the invention have been shown by way of illustration, many modifications and changes will occur to those skilled in the art. For example, it would be wholly within the purview of this invention to utilize either reflective image recording media or reflective spatial filters, or both, instead of the transmissive recording media and spatial filters described herein. It is, therefore, to be understood that the appended claims are intended to cover all such modifications and changes as fall within the true spirit and scope of the invention.

What we claim as new and desire to secure by Letters Patent of the United States is:

1. A method for identifying a display of graphic characters from a succession of displays, each display having one graphic representation common to all such displays comprising the steps of: impressing on a medium an image of an area substantially larger than the area of said graphic display substantially simultaneously with the exposure of the medium to said display, providing a complex holographic spatial filter having recorded diffraction pattern information of each of the alpha-numeric characters from which the alpha-numeric characters of the display are selected, transmitting a beam of substantially coherent light to said image of the display to be modulated thereby, impinging said modulated beam on the spatial filter to produce spots of light, each spot corresponding to an alpha-numeric character in the image impressed on said medium and formed at a location determined by the optical information in said filter and the position of the corresponding alpha-numeric characters in the image impressed on said medium, each display to be recognized bearing optical information common to all such displays at a definite location on the displays to produce a light spot in a fixed relative position with respect to the light spots produced by the other alpha-numeric characters and measuring the positional relationship between said one light spot and the remaining light spots to determine the alpha-numeric characters of the display.

2. The method for identifying the display of graphic characters of claim 1 wherein the step of converting the positions of the light spots into signals representative of said positions comprises the steps of: scanning said viewing plane according to predetermined scan patterns; producing an output signal upon detection of each position of imaged light; measuring the time elapsed from the beginning of each scan pattern to detection of a position of imaged light within said pattern; and producing a signal representative of each of said elapsed times.

3. A system for identifying each one of a number of displays of graphic characters occurring in succession comprising means for substantially instantaneously recording an image of each of said displays; complex holographic spatial filter means including recorded diffraction pattern information of each of the alpha-numeric characters, from which the alpha-numeric characters of the display are selected, a source of substantially coherent light, means for directing a beam of said light onto the recorded image and impinging the light modulated thereby on said spatial filter means to form spots of light, each spot corresponding to an alpha-numeric character in said recorded image and formed at a location determined by the optical information in said filter and the position of the corresponding alpha-numeric character in the recorded image, detecting means responsive to said spots of light and means responsive to said detecting means for producing electric signals dependent upon the location of each of said spots of light and indicative of the corresponding alpha-numeric character.

4. The system for identifying each one of a plurality of displays of graphic characters occurring in succession of claim 1 wherein said spots of light lie in an image plane, and wherein said detecting means further includes means for scanning said image plane, said scanning means generating a fine scan over a portion of said image plane until a first spot corresponding to optical information contained at a predetermined fixed location on said display is located on said image plane and thereafter generating a coarse scan across a remaining portion of said image plane.

5. The system for identifying each one of a plurality of displays of graphic characters occurring in succession of claim 2 wherein said spatial complex holographic filter means comprises a single complex multiple filter bearing superimposed diffraction patterns of each of the characters expected to appear on said display.

6. The system for identifying each one of a plurality of displays of graphic characters occurring in succession of claim 1 wherein said spatial filter means comprises a plurality of complex holographic filters, each said filter bearing a diffraction patern of at least one of the characters expected to appear on said display; said system further including means for rapidly inserting each of said filters in succession into said beam of light.

7. The system for identifying each one of a plurality of displays of graphic characters occurring in succession of claim 4 wherein said spots of light lie in an image plane, and wherein said detecting means further includes means for scanning said image plane, said scanning means generating scans in one dimension on said image plane and advancing said scans across said image plane in a second dimension orthogonal to said first dimension until a first spot corresponding to optical information found at one location in all of the displays to be recognized is located on said image plane corresponding to a graphic representation found in all the displays to be recognized and thereafter generating a predetermined number of scans in said one dimension through the point in said second dimension at which said first spot was located.

8. A system for identifying a display of graphic characters comprising: a television camera viewing said display; a deformable image recording medium; means responsive to said television camera for substantially instantaneously deforming said recording medium in accordance with the image of said display viewed by said television camera; complex holographic spatial filter means including recorded diffraction pattern information of each of the alpha-numeric characters from which the alpha-numeric characters of the display are selected, a source of substantially coherent light, means for directing the beam of light onto the recorded image and impinging the light modulated thereby on said spatial filter means to form spots of light, each spot corresponding to an alpha-numeric character in said recorded image and formed at a location determined by the diffraction pattern information recorded in said filter and the position of the corresponding alpha-numeric character in the recorded image, detecting means responsive to said spots of light and means responsive to said detecting means for producing signals dependent upon the location of each of said spots of light and indicative of the corresponding alpha-numeric character.

9. The system for identifying a display of graphic characters of claim 6 wherein said spots of light lie in an image plane, and wherein said detecting means further includes means for scanning said image plane, said scanning means generating a raster over a portion of said image plane until a first spot corresponding to optical information found at one location in all of the displays to be recognized is detected on said plane and thereafter generating a predetermined number of scan patterns over said plane to detect and identify each of the remaining spots appearing on said plane.

10. A vehicle license plate identification system comprising: a television camera; means responsive to a predetermined position of a vehicle for activating said television camera to view the portion of said vehicle on which a license plate is mounted; means responsive to said television camera for producing a recorded image of the area viewed by said television camera; a source of substantially coherent light; a spatial filter means including recorded diffraction pattern information of each of the alpha-numeric characters from which the alpha-numeric characters of the display are selected, a source of substantially coherent light, means for directing a beam of said light onto the recorded image and impinging the light modulated thereby on said spatial filter means to form spots of light at locations determined by the optical information in said filter and the position of the corresponding alpha-numeric character in the recorded display, detecting means responsive to said spots of light and means responsive to said detecting means for producing electric signals dependent upon the location of each of said spots of light and indicative of the corresponding alpha-numeric character.

11. The vehicle license plate identification system of claim 8 wherein the area viewed by said camera is substantially larger than the area covered by the graphic display and wherein said system further includes means for scanning an area including all of said spot locations, said scanning means generating a raster over a portion of said image area until a first spot corresponding to optical information found at one location in all of the displays to be recognized is located on said area and thereafter scanning the remainder of said area to detect and identify each of the remaining spots appearing on said plane by establishing the positional relation of each of said spots of light with respect to said first spot.

12. The vehicle license plate identification system of claim 10 wherein said means for producing a transparency bearing the image viewed by said television camera comprises a deformable image recording medium and means generating an electron beam directed onto said recording medium so as to reproduce by deformation of said medium the image viewed by said television camera.

13. The vehicle license plate identification system of claim 10 wherein said means for producing a transparency bearing the image viewed by said television camera comprises a photosensitive deformable image recording medium and means generating an additional beam of light directed onto said recording medium so as to reproduce by deformation of said medium the image viewed by said television camera.

14. A system for identifying each one of a rapidly-occurring succession of displays of graphic characters comprising: an image recording medium; means for substantially instantaneously recording an image of each of said displays in succession on a portion of said medium; complex holographic spatial filter means including recorded diffraction pattern information of each of the alpha-numeric characters from which the alpha-numeric characters of the displays are selected, a source of substantially coherent light, means for directing the beam of light onto the recorded image of a selected display and impinging the light modulated thereby on said spatial filter means to form spots of light, each spot corresponding to an alpha-numeric character in said selected recorded image and formed at a location determined by the optical information in said filter and the position of the corresponding alpha-numeric character in the selected recorded image, detecting means responsive to said spots of light and means responsive to said detecting means for producing electric signals dependent upon the location of each of said spots of light and indicative of the corresponding alpha-numeric character.

15. The system for identifying each one of a rapidly-occurring succession of displays of graphic characters of claim 14 including comparison means measuring the total number of images recorded on said medium and the total number of images read out, said comparison means successively advancing into the path of said light the recorded portions of said medium to be read out until both said total numbers are identical.

16. The system for identifying each one of a rapidly-occurring succession of displays of graphic characters of claim 15 wherein said image recording medium comprises a thermoplastic deformable medium, and said means for substantially instantaneously recording an image of one of said displays on a portion of said medium comprises a television camera viewing said display and means responsive to said television camera for scanning an electron beam across said portion of said medium in order to deform said medium in accordance with the scene viewed by said camera.

17. The system for identifying each one of a rapidly-occurring succession of displays of graphic characters of claim 15 wherein said image recording medium comprises a thermoplastic photoconductive medium, and said means for substantially instantaneously recording an image of one of said displays on a portion of said medium comprises a television camera viewing said display and means responsive to said television camera for scanning a light beam across said portion of said medium in order to deform said medium in accordance with the scene viewed by said camera.

18. The system for identifying each one of a rapidly-occurring succession of displays of graphic characters of claim 14 wherein said means responsive to said detecting means comprises means detecting each of said spots individually according to a predetermined sequence in each of said displays.

19. The system for identifying each one of a rapidly-occurring succession of displays of graphic characters of claim 15 wherein said image recording medium comprises a transparent liquid deformable medium of low volatility, and said means for substantially instantaneously recording an image of one of said displays on a portion of said medium comprises a television camera viewing said display and means responsive to said television camera for scanning an electron beam across said portion of said medium in order to deform said medium in accordance with the scene viewed by said camera.

20. A system for identifying a display of graphic characters comprising: a television camera viewing said display; means responsive to said television camera for producing a transparency bearing the image viewed by said television camera substantially instantaneously with the viewing by said television camera; complex holographic spatial filter means including recorded diffraction pattern information of each of the alpha-numeric characters from which the alpha-numeric characters of the display are selected, a source of substantially coherent light, means for directing the beam of light onto the recorded image and impinging the light modulated thereby on said spatial filter means to form spots of light each spot corresponding to an alpha-numeric character in said recorded image and formed at a location determined by the optical information in said filter and the position of the corresponding alpha-numeric character in the recorded image, detecting means responsive to said spots of light and means responsive to said detecting means for producing electric signals dependent upon the location of each of said spots of light and indicative of the corresponding alpha-numeric character.

21. The system of claim 20 wherein said means responsive to said television camera for producing a transparency bearing the image viewed by said television camera comprises a photosensitive deformable image recordng medium and flying spot scanner means directing light onto said recording medium so as to reproduce by deformation of said medium the image viewed by said television camera.

References Cited

UNITED STATES PATENTS

| | | | |
|---|---|---|---|
| 2,982,176 | 5/1961 | Kay | 350—3.5UX |
| 3,196,392 | 7/1965 | Horwitz et al. | 340—146.3 |
| 3,222,682 | 12/1965 | Scott | 346—107 |
| 3,234,392 | 2/1966 | Dickinson | 340—146.3X |
| 3,240,108 | 3/1966 | Lehan et al. | 350 —3.5UX |
| 3,305,834 | 2/1967 | Cooper et al. | 340—146.3 |
| 3,333,244 | 7/1967 | Brown | 340—146.3 |
| 3,346,845 | 10/1967 | Fomenko | 340—146.3 |
| 3,388,240 | 6/1968 | Robbins | 340—146.3X |
| 3,427,586 | 2/1969 | Lohmann | 340—146.3 |

OTHER REFERENCES

Gabor, Nature, "Character Recognition by Holography," vol. 208, No. 5009, Oct. 30, 1965, pp. 422 and 423.

Vander Lugt, IEEE Transactions on Information Theory, "Signal Detection by Complex Spatial Filtering," vol. IT–10, No. 2, April 1964, pp. 139–145.

MAYNARD R. WILBUR, Primary Examiner

L. H. BOUDREAU, Assistant Examiner

U.S. Cl. X.R.

350—3.5, 162; 356—71